(12) United States Patent
Moon

(10) Patent No.: US 8,493,518 B2
(45) Date of Patent: Jul. 23, 2013

(54) LCDS WITH INTEGRATED TOUCH PANELS

(75) Inventor: Seung-hwan Moon, Yongin-si (KR)

(73) Assignee: Samsung Display Co., Ltd. (KR)

( * ) Notice: Subject to any disclaimer, the term of this patent is extended or adjusted under 35 U.S.C. 154(b) by 319 days.

(21) Appl. No.: 11/975,550

(22) Filed: Oct. 19, 2007

(65) Prior Publication Data

US 2008/0129898 A1    Jun. 5, 2008

(30) Foreign Application Priority Data

Nov. 9, 2006    (KR) .................. 10-2006-0110515

(51) Int. Cl.
*G02F 1/1335* (2006.01)
*G06F 3/045* (2006.01)

(52) U.S. Cl.
USPC .......................................... 349/12; 345/174

(58) Field of Classification Search
USPC ............................................................ 349/12
See application file for complete search history.

(56) References Cited

U.S. PATENT DOCUMENTS

| | | | |
|---|---|---|---|
| 5,305,017 A | | 4/1994 | Gerpheide |
| 5,777,596 A | * | 7/1998 | Herbert .......................... 345/104 |
| 5,872,561 A | * | 2/1999 | Figie et al. ...................... 345/168 |
| 6,501,529 B1 | * | 12/2002 | Kurihara et al. ............... 349/160 |
| 2001/0000676 A1 | * | 5/2001 | Zhang et al. ..................... 349/12 |
| 2002/0015024 A1 | * | 2/2002 | Westerman et al. ........... 345/173 |
| 2002/0089813 A1 | * | 7/2002 | Yamamoto et al. ............ 361/328 |
| 2004/0155871 A1 | * | 8/2004 | Perski et al. .................... 345/174 |
| 2004/0169625 A1 | * | 9/2004 | Park et al. ......................... 345/87 |
| 2005/0093466 A1 | | 5/2005 | Matsumoto |
| 2006/0077186 A1 | * | 4/2006 | Park et al. ....................... 345/173 |
| 2006/0170658 A1 | * | 8/2006 | Nakamura et al. ............. 345/173 |
| 2006/0256093 A1 | * | 11/2006 | Furukawa et al. ............. 345/173 |
| 2007/0097278 A1 | * | 5/2007 | Rho et al. ......................... 349/12 |
| 2007/0195029 A1 | * | 8/2007 | Jeon et al. ......................... 345/87 |

FOREIGN PATENT DOCUMENTS

| | | |
|---|---|---|
| EP | 0568342 A1 | 11/1993 |
| EP | 0796485 A1 | 9/1997 |
| JP | 59-192765 U | 12/1984 |
| JP | 2-55323 U | 4/1990 |
| JP | 05-006153 A | 1/1993 |
| JP | 05-224818 A | 9/1993 |
| JP | 06-034940 A | 2/1994 |
| JP | 2006-154815 A | 6/2006 |
| WO | 96/18179 A1 | 6/1996 |

OTHER PUBLICATIONS

Korean Patent Abstracts, Publication No. 1020040056746, Jul. 1, 2004, 2 pp.

* cited by examiner

*Primary Examiner* — Edward Glick
*Assistant Examiner* — Dennis Y Kim
(74) *Attorney, Agent, or Firm* — Innovation Counsel LLP

(57) ABSTRACT

An LCD with an integrated touch panel that prevents sensor malfunction by eliminating coupling noises includes an insulating substrate, a plurality of gate lines formed on the insulating substrate so as to extend in a first direction, a plurality of data lines formed in a second direction so as to intersect the plurality of gate lines, a plurality of thin film transistors (TFTs), each formed at an area defined by the gate lines and the data lines, a plurality of sensor lines formed in the same directions as the gate lines and the data lines, and a plurality of dummy lines formed in the same directions as the sensor lines.

17 Claims, 12 Drawing Sheets

LCDS WITH INTEGRATED TOUCH PANELS

RELATED APPLICATIONS

This application claims priority of Korean Patent Application No. 10-2006-0110515, filed Nov. 9, 2006, the entire disclosure of which is incorporated herein by reference.

BACKGROUND

This invention relates to liquid crystal displays (LCDs) with integrated touch panels, and more particularly, to LCDs with integrated touch panels that prevent sensor malfunction by eliminating coupling noises.

A wide variety of display devices capable of displaying images are known, including cathode ray tubes (CRTs), liquid crystal displays (LCDs), plasma display panels (PDPs), and so on. In such display devices, a touch panel may used as an input means adapted to sense a location on a display screen to which pressure is applied, and a user of the touch panel can thereby easily enter data by touching the display screen with a pen, a finger, or the like.

In order to address issues relating to the thickness or size of a touch panel, new types of LCDs with integrated touch panels are currently being developed. In these, efforts are being made to reduce the thickness of the touch panel, which is an advantageous feature in manufacturing thin LCDs. In addition, since it is not necessary to assemble separate modules, these new LCDs are particularly effective in increasing production yields.

In an LCD having an integrated touch panel, a common electrode formed on a common electrode panel comes into contact with a sensor electrode formed on a thin film transistor (TFT) array panel in response to external pressure of a finger or the like, so that a predetermined voltage is applied to a sensor line and then provided to a sensor so as to output a signal having a specific level.

However, in this arrangement, a common voltage distortion can occur due to coupling between a data line formed on the TFT array panel and the common electrode formed on the common electrode panel. Whenever a data voltage is applied to a data line, the common voltage becomes severely distorted. Accordingly, the distorted common voltage is provided to the sensor through the sensor line, and since the sensor determines the polarities of two signals, that is, a reference signal having a specific level and a signal derived from the distorted common voltage, the polarities may be erroneously determined. Consequently, even when no external pressure is being applied to the touch panel, it may erroneously report the application of an external pressure. Moreover, when an external pressure is being applied to the touch panel, it is difficult to determine a coordinates signal that is indicative of the actual position corresponding to that external pressure.

BRIEF SUMMARY

In accordance with the exemplary embodiment described herein, an LCD with an integrated a touch panel is provided that prevents sensor malfunction by eliminating coupling noises.

In one exemplary embodiment, an LCD comprises an insulating substrate, a plurality of gate lines formed on the insulating substrate so as to extend in a first direction, a plurality of data lines formed in a second direction so as to intersect the gate lines, a plurality of thin film transistors (TFTs), each formed at an area defined by the gate lines and the data lines, a plurality of sensor lines formed in the same directions as the gate lines and data lines, and a plurality of dummy lines formed in the same directions as the sensor lines.

In another exemplary embodiment, an LCD with an integrated a touch panel comprises a thin film transistor (TFT) array panel, including a plurality of gate lines formed on an insulating substrate so as to extend in a first direction, a plurality of data lines formed in a second direction so as to intersect the gate lines, a plurality of thin film transistors (TFTs), each formed at an area defined by the gate lines and the data lines, a plurality of sensor lines formed in the same directions as the gate lines and data lines, a plurality of dummy lines formed in the same directions as the sensor lines, and a printed circuit board, including a first interconnection line for applying a predetermined voltage to the dummy lines, a second interconnection line for applying a gate-off voltage in the gate driver connected to the plurality of gate lines, and a capacitor coupled between the first and second interconnection lines for eliminating coupling noises.

A better understanding of the above and many other features and advantages of the novel touch screen LCDs of the present invention may be obtained from a consideration of the detailed description of some exemplary embodiments thereof below, particularly if such consideration is made in conjunction with the appended drawings, wherein like reference numerals are used to identify like elements illustrated in one or more of the figures thereof.

DETAILED DESCRIPTION

Figure 1:
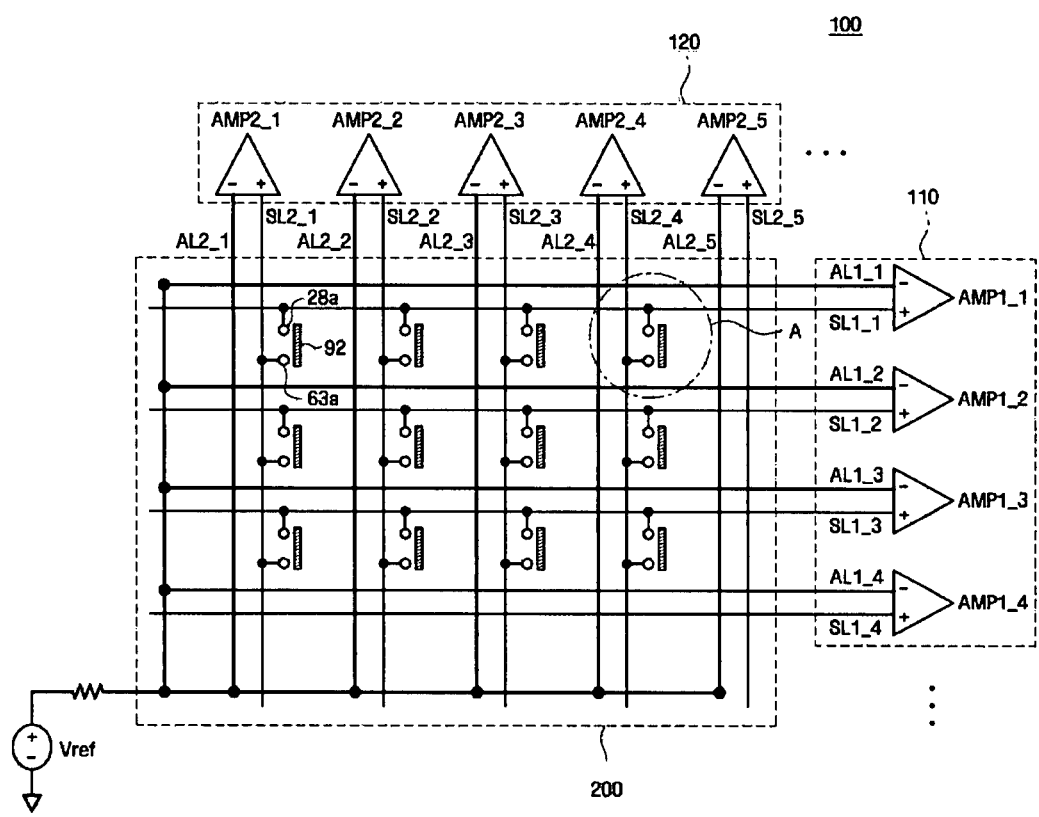
FIG. 1 is a partial schematic diagram of a first exemplary embodiment of an LCD with an integrated touch panel in accordance with the present invention.
Figure 2:
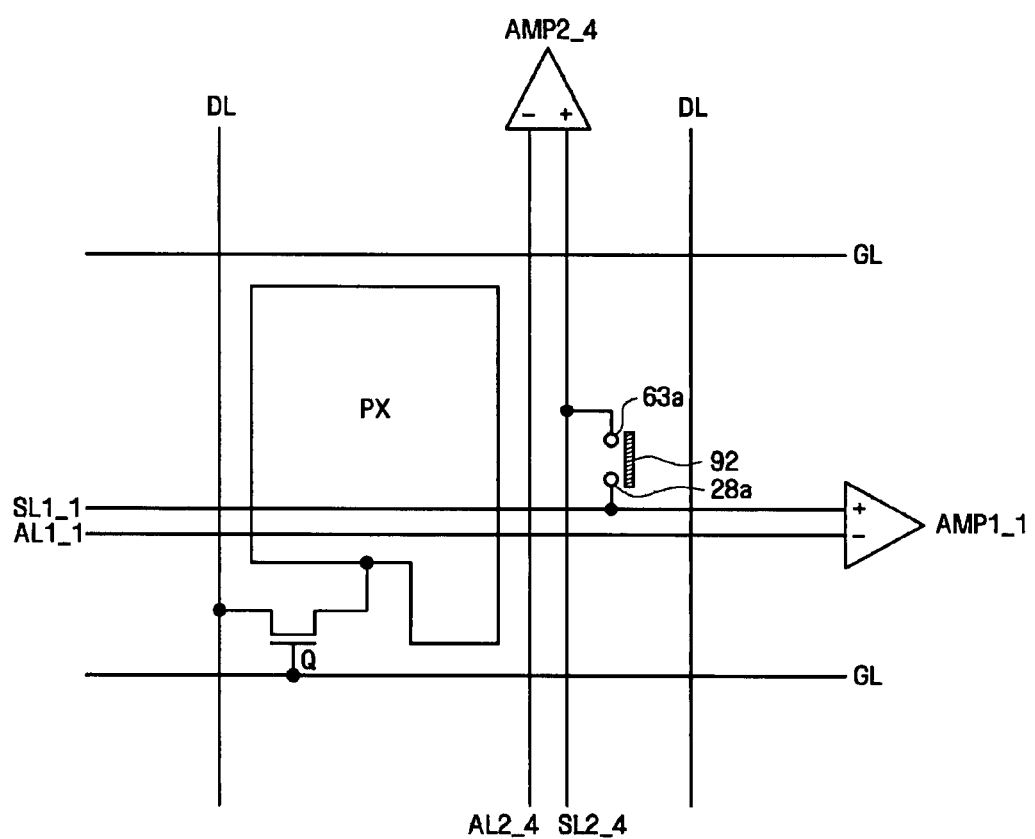
FIG. 2 is an enlarged schematic detail view of a portion of the exemplary LCD of FIG. 1 encircled by the phantom line 'A' therein.
Figure 3A:
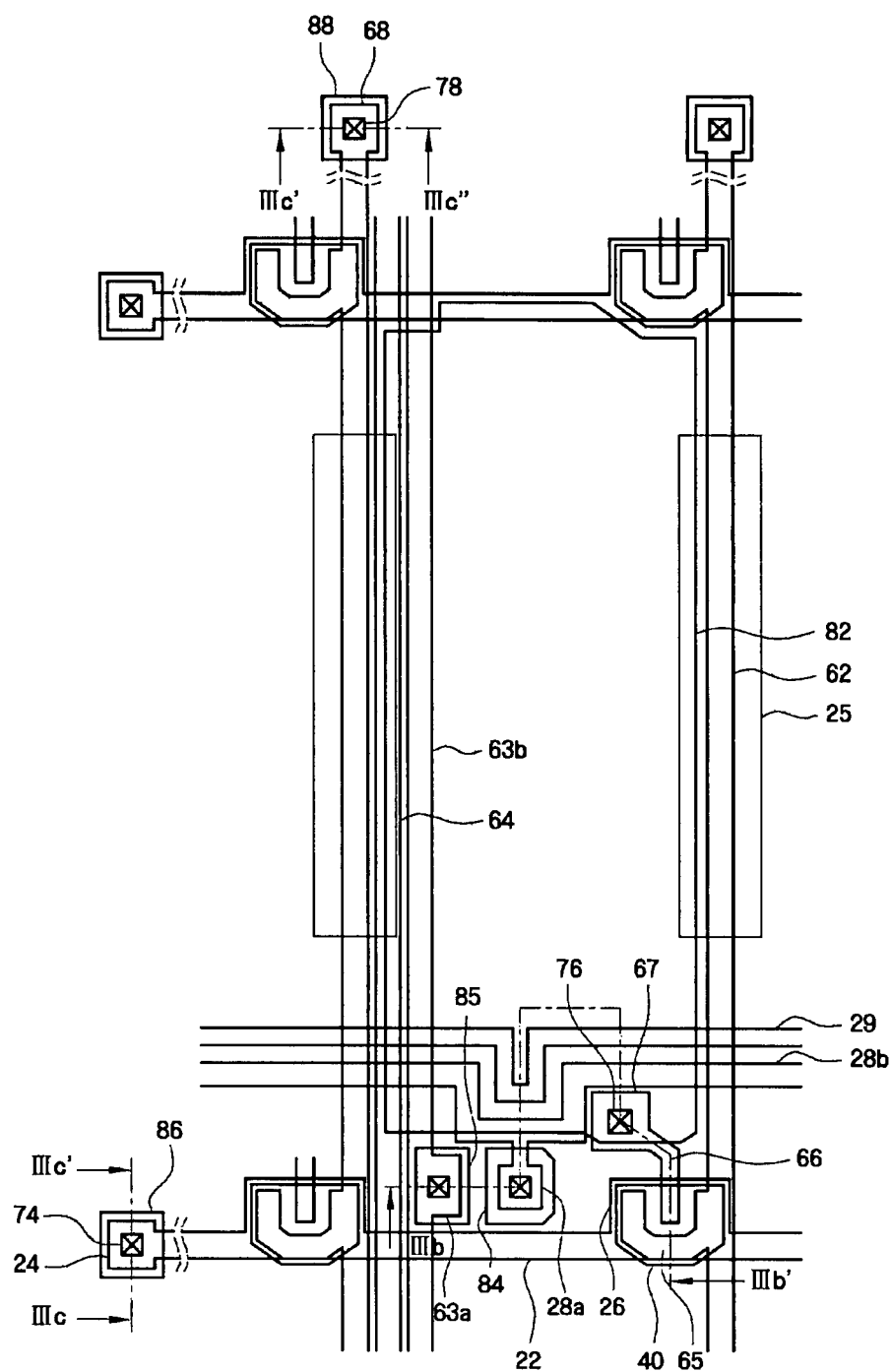
FIG. 3A is a partial plan view of a thin film transistor (TFT) array panel of the exemplary LCD of FIG. 1, showing a single, exemplary pixel thereof.
Figure 3B:
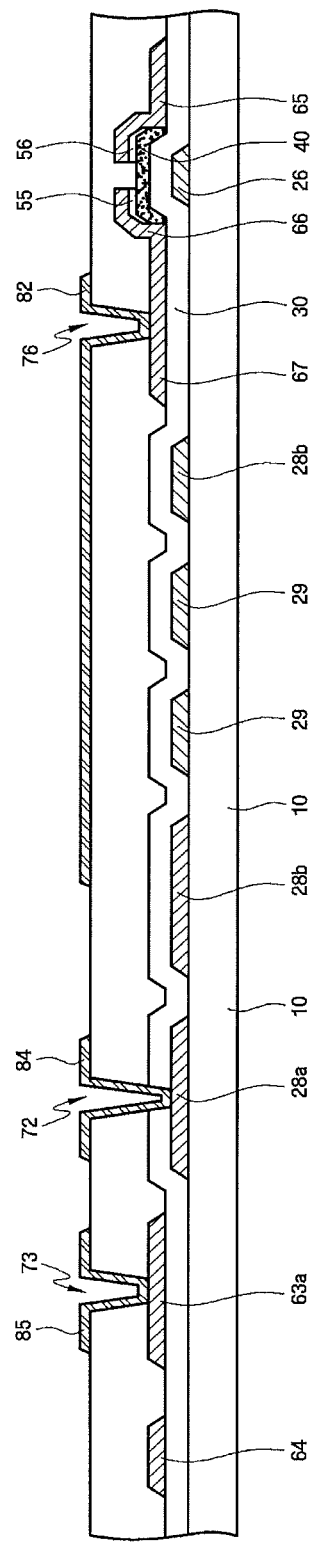
FIG. 3B is a partial cross-sectional view of the TFT array panel of FIG. 3A, as seen along the lines of the section IIIb-IIIb' taken therein.
Figure 3C:
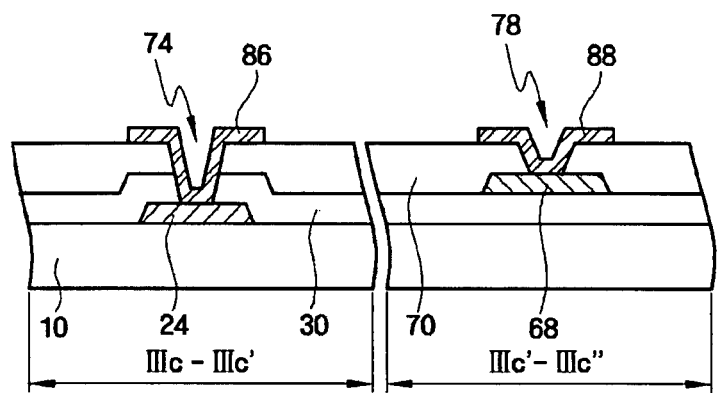
FIG. 3C is an enlarged partial cross-sectional view of the TFT array panel of FIG. 3A, as seen along the lines of the section IIIc-IIIc' and IIIc'-IIIc'' taken therein.

FIG. 1 is a partial schematic diagram of a first exemplary embodiment of an LCD with an integrated touch panel in accordance with the present invention, FIG. 2 is an enlarged schematic detail view of a portion of the exemplary LCD of FIG. 1 encircled by the phantom line 'A' therein, FIG. 3A is a partial plan view of a thin film transistor (TFT) array panel of the exemplary LCD of FIG. 1, showing a single, exemplary pixel area thereof, FIG. 3B is a partial cross-sectional view of the TFT array panel of FIG. 3A, as seen along the lines of the section IIIb-IIIb' taken therein, and FIG. 3C is an enlarged partial cross-sectional view of the TFT array panel of FIG. 3A, as seen along the lines of the section IIIc-IIIc' and IIIc'-IIIc" taken therein Referring to FIG. 1, in the first exemplary LCD with an integrated touch panel, a TFT array panel 100 thereof includes a touch panel outputting a coordinates signal corresponding to a touch position on the touch panel when an external pressure is applied to the panel.

Respective pluralities of first and second sensor lines SL1_1 through SL1_4 and SL2_1 through SL2_5 are respectively formed in generally orthogonal first and second directions on an insulating substrate of the TFT array panel 100, and respective pluralities of first and second dummy lines AL1_1 through AL1_4 and AL2_1 through AL2_5 are also formed thereon in the same directions as the first and second sensor lines SL1_1 through SL1_4 and SL2_1 through SL2_5, respectively. A reference voltage Vref is applied to the first and second dummy lines AL1_1 through AL1_4 and AL2_1 through AL2_5.

The first and second sensor lines SL1_1 through SL1_4 and SL2_1 through SL2_5 are connected to the first and second sensor electrodes 28a and 63a, respectively. When an external pressure is applied to the front surface of the display in the vicinity of associated pairs of the sensor electrodes, a sensor spacer 92 formed on the common electrode panel 200 is electrically connected to the first and second sensor electrodes 28a and 63a of the TFT array panel 100, so that a predetermined voltage is transmitted to the first and second sensor lines SL1_1 through SL1_4 and SL2_1 through SL2_5.

In addition, the TFT array panel 100 includes a plurality of first comparators AMP1_1 through AMP1_4 respectively connected to the first sensor lines SL1_1 through SL1_4 and the first dummy lines AL1_1 through AL1_4 and amplifying voltage differences between each of the first sensor lines SL1_1 through SL1_4 and each of the first dummy lines AL1_1 through AL1_4 and then outputting the amplified voltage differences, and a plurality of second comparators AMP2_1 through AMP2_5 respectively connected to the second sensor lines SL2_1 through SL2_5 and the second dummy lines AL2_1 through AL2_5 and amplifying voltage differences between each of the second sensor lines SL2_1 through SL2_5 and each of the second dummy lines AL2_1 through AL2_5 and then outputting the amplified voltage differences.

The purpose in forming the first and second dummy lines AL1_1 through AL1_4 and AL2_1 through AL2_5 in the same directions as the first and second sensor lines SL1_1 through SL1_4 and SL2_1 through SL2_5, respectively, in the first exemplary embodiment is described below.

In a convention touch screen embodiment, a common voltage may be distorted due to coupling between data lines (not illustrated) formed on the TFT array panel 100 and a common electrode (not illustrated) formed on the common electrode panel 200. This common voltage distortion becomes more severe whenever there is a change in the data voltage applied to the data lines. As a result, the distorted common voltage is transmitted to the first and second sensor lines SL1_1 through SL1_4 and SL2_1 through SL2_5, and the first and second comparators AMP1_1 through AMP1_4 and AMP2_1 through AMP2_5 may then erroneously determine the polarities of two signals, that is, the reference signal having a specific level and a signal derived from the distorted common voltage. Thus, even if no external pressure is being applied to the display, the touch sensor mechanism may still indicate that an external pressure is being applied. Moreover, even if an external pressure is actually being applied, it is quite difficult to determine the actual coordinates of the touch position corresponding to the external pressure.

To solve this problem, the first and second dummy lines AL1_1 through AL1_4 and AL2_1 through AL2_5 are formed in the same directions as the first and second sensor lines SL1_1 through SL1_4 and SL2_1 through SL2_5, respectively, thereby ensuring that the first and second dummy lines AL1_1 through AL1_4 and AL2_1 through AL2_5 are similarly affected by coupling with the first and second sensor lines SL1_1 through SL1_4 and SL2_1 through SL2_5 when the first and second sensor lines SL1_1 through SL1_4 and SL2_1 through SL2_5 are affected by coupling from the common electrode of the common electrode panel 200.

The first and second dummy lines AL1_1 through AL1_4 and AL2_1 through AL2_5 and the first and second sensor lines SL1_1 through SL1_4 and SL2_1 through SL2_5 have substantially the same phases. Accordingly, the common voltage is applied to the first and second comparators AMP1_1 through AMP1_4 and AMP2_1 through AMP2_5 through the first and second sensor lines SL1_1 through SL1_4 and SL2_1 through SL2_5, and the reference voltage, which has same phase as the common voltage, is applied to the first and second dummy lines AL1_1 through AL1_4 and AL2_1 through AL2_5. Next, the first and second comparators AMP1_1 through AMP1_4 and AMP2_1 through AMP2_5 compare the common voltage with the reference voltage and output a predetermined sensing voltage indicative of the coordinates data corresponding to a touch position to output ports of the first and second comparators AMP1_1 through AMP1_4 and AMP2_1 through AMP2_5, based on the comparison result. Thus, since the first and second comparators AMP1_1 through AMP1_4 and AMP2_1 through AMP2_5 compare the common voltage and a reference voltage that has the same phase as the common voltage, an erroneous determination of polarity caused by a determination of relative polarities is prevented.

FIG. 2 is an equivalent circuit diagram illustrating display signal lines and pixels, including a touch panel, in which the display signal lines include gate lines indicated by GL and data lines indicated by DL.

Referring to FIG. 2, each pixel PX includes a switching device Q connected to a corresponding one of the gate lines GL and a corresponding one of the data lines DL, a liquid crystal capacitor connected to the switching device Q, and a storage capacitor.

In addition, the pixel PX includes the first sensor line SL1_1 and the first dummy line AL1_1 formed in the same direction as the gate lines GL, the second sensor line SL2_4 and the second dummy line AL2_4 formed in the same direction as the data lines DL, the first and second sensor electrodes 28a and 63a connected to respective ones of the first and second sensor lines SL1_1 and SL2_4, the first comparator AMP1_1 connected to the first sensor line SL1_1 and the first dummy line AL1_1, and the second comparator AMP2_4 connected to the second sensor line SL2_4 and the second dummy line AL2_4.

Referring to FIGS. 3A through 3C, a gate line 22 is formed on an insulating substrate 10 in the horizontal direction in the figures, and a gate electrode 26 is formed on the gate line 22 in the form of a protrusion. A gate line end portion 24 is formed at an end of the gate line 22 to receive a gate signal from other layers or from the outside and transmit the received gate signal to the gate line 22. The width of the gate line end portion 24 is expanded for connection to an external circuit. The gate line 22, the gate electrode 26, and the gate line end portion 24 constitute a gate interconnection line (22, 26, 24).

In addition, a storage electrode 25 overlaps a pixel electrode 82 (described in more detail below) to form a storage capacitor, which improves the charge retention capacity of the pixel. The shape and arrangement of the storage electrode 25 may vary widely from those illustrated.

The first sensor line 28b is formed on the insulating substrate 10 in the same direction as the gate line 22, and the first sensor electrode 28a having an extended width is formed on the insulating substrate 10 in the same direction as the first sensor line 28b. The first sensor electrode 28a comprises one terminal of a touch panel sensor and is connected to the first sensor pad 84 through a contact hole 72. When an external pressure is applied to the panel in the vicinity of the sensor pad, the first sensor electrode 28a is electrically connected to the common electrode on a sensor spacer 92 (see FIG. 4) described in more detail below, to then provide position information corresponding to the position at which the external pressure, e.g., a finger touch, is applied. The first sensor electrode 28a and the first sensor line 28b constitute a first sensor interconnection line. Furthermore, the first dummy line 29 is formed in the same direction as the first sensor interconnection lines 28a and 28b. In the embodiment illustrated, the first sensor interconnection lines 28a and 28b and the first dummy line 29 are formed in the same layer as the gate interconnection line (22, 24, 26).

The gate interconnection line (22, 24, 26), the storage electrode 25, the first sensor interconnection lines 28a and 28b and the first dummy line 29 are preferably made of an Al-containing metal, such as Al or Al alloy, a Ag-containing metal, such as Ag or Ag alloy, a Cu-containing metal, such as Cu or Cu alloy, a Mo-containing metal, such as Mo or Mo alloy, Cr, Ti, or Ta.

In other possible embodiments, the gate interconnection line (22, 24, 26), the storage electrode 25, the first sensor interconnection lines 28a and 28b and the first dummy line 29 may have a multi-layered structure that comprises two conductive films (not illustrated) having different but respectively advantageous physical characteristics. One of the two films is preferably made of a low resistivity metal, including an Al alloy, an Ag alloy, and a Cu alloy, for reducing the signal delay or voltage drop in the gate interconnection line (22, 24, 26), the storage electrode 25, the first sensor interconnection lines 28a and 28b or the first dummy line 29. The other film is preferably made of a material, such as a Mo, Cr, Ta or Ti containing metal, that has good physical, chemical and electrical contact characteristics with other materials, such as indium tin oxide (ITO) or indium zinc oxide (IZO). Examples of combinations of the two films include a lower Cr film and an upper Al (alloy) film and a lower Al (alloy) film and an upper Mo (alloy) film. However, the gate interconnection line (22, 24, 26), the storage electrode 25, the first sensor interconnection lines 28a and 28b and the first dummy line 29 may also be made of a variety of other metals or conductors, as well.

A gate insulating layer 30 made of, for example, silicon nitride (SiNx), is formed on the gate interconnection line (22, 24, 26), the storage electrode 25, the first sensor interconnection lines 28a and 28b and the first dummy line 29.

A semiconductor layer 40 made of hydrogenated amorphous silicon or polycrystalline silicon is formed on the gate insulating layer 30. The semiconductor layer 40 may have various shapes, such as an island shape or a stripe shape. In the particular exemplary embodiment illustrated, for example, the semiconductor layer 40 is stripe shaped. When the semiconductor layer 40 is formed in a stripe shape, it may be formed by patterning in the same manner as the data line 62.

Ohmic contact layers 55 and 56 made using a material, such as silicide or n+ hydrogenated amorphous silicon doped with n-type impurities at high concentration, are formed on the semiconductor layer 40. The ohmic contact layers 55 and 56 may also be formed in an island shape or stripe shape and positioned below the drain electrode 66 and the source electrode 65. When the ohmic contact layers 55 and 56 are formed in a stripe shape, they extend below the data line 62.

A data line 62 and a drain electrode 66 are formed on the ohmic contact layers 55 and 56 and the gate insulating layer 30. The data line 62 extends in the vertical direction in the figures and intersects the gate line 22, which extend in the horizontal direction. The source electrode 65 extends over the semiconductor layer 40 as a branch of the data line 62. A data line end portion 68 is formed at one end of the data line 62. The end portion receives data signals from another layer or from an external circuit and transmits the data signals to the data line 62. The data line end portion 68 has an expanded width so that it can be connected with the external circuit. The drain electrode 66 is separate from the source electrode 65 and is located on the semiconductor layer 40 so as to face the source electrode 65 at the opposite side of the gate electrode 26. The drain electrode 66 comprises a bar-type pattern, which is formed on the semiconductor layer 40, and a drain electrode extension 67 that extends from the bar-type pattern and has a wide area that contacts a contact hole 76.

The data line 62, the source electrode 65, the drain electrode 66, the data line expansion 67, and the data line end portion 68 constitute a data interconnection line (62, 65, 66, 67, 68).

The second sensor line 63b that is formed in the same direction as the data line 62 and the second sensor electrode 63a that is a protrusion of the second sensor line 63b having an extended width are each formed on the gate insulating layer 30. Here, the second sensor electrode 63a functions as a terminal of a touch panel sensor and is connected to a second sensor pad 85 through a contact hole 73. Upon application of an external pressure, the second sensor electrode 63a is electrically connected to the common electrode on a sensor spacer (92 of FIG. 4) described below, and information corresponding to the location at which the external pressure is applied to the display is provided. The second sensor electrode 63a and the second sensor line 63b constitute a second sensor interconnection line (63a, 63b). With respect to the location of the application of the external pressure, the first sensor interconnection lines 28a and 28b provide horizontal, or latitudinal, coordinates and the second sensor interconnection lines 63a and 63b provide vertical, or longitudinal, coordinates. A second dummy line 64 is disposed in the same direction as the second sensor line 63b. In this particular embodiment, the second sensor interconnection lines 63a and 63b and the second dummy line 64 are formed in the same layer as the data interconnection line (62, 65, 66, 67, 68).

The interconnection line (62, 65, 66, 67, 68), the second sensor interconnection line (63a, 63b), and the second dummy line 64 may include a single layer made of at least one selected from the group consisting of Al, Cr, Mo, Ta, and Ti, or alternatively, may comprise a multilayered structure. For example, the interconnection line (62, 65, 66, 67, 68), the second sensor interconnection line (63a, 63b), and the second dummy line 64 are preferably made of a refractory metal, such as Cr, Mo, or Ti. Also, the interconnection line (62, 65, 66, 67, 68), the second sensor interconnection line (63a, 63b), and the second dummy line 64 may have a multilayered structure that includes a low-resistivity lower film (not illustrated) and a good-contact upper film (not illustrated). Examples of such multi-layered structures include a double-layered structure having a lower Cr film and an upper Al (alloy) film, a double-layered structure having a lower Mo (alloy) film and an upper Al (alloy) film, and a triple-layered structure having a lower Mo film, an intermediate Al film, and an upper Mo film.

The source electrode 65 has at least a portion overlapping the semiconductor layer 40, and the drain electrode 66 faces the source electrode 65 about the gate electrode 26 and has at least a portion overlapping the semiconductor layer 40. Here, the ohmic contact layers 55 and 56 are interposed between the semiconductor layer 40 and the source electrode 65 and between the semiconductor layer 40 and the drain electrode 66 to reduce the contact resistance therebetween.

A passivation layer 70 functioning as an insulating layer is formed on the data interconnection line (62, 65, 66, 67, 68), the second sensor interconnection line (61, 63), the second dummy line 64, and an exposed portion of the semiconductor layer 40. In this particular embodiment, the passivation layer 70 is preferably made of an inorganic insulator, such as silicon nitride or silicon oxide, a photosensitive organic material having a good flatness characteristic, or a low dielectric insulating material, such as a-Si:C:O and a-Si:O:F formed by plasma enhanced chemical vapor deposition (PECVD). When the passivation layer 70 is made of an organic insulator, the passivation layer 70 may include a lower film of an inorganic insulator and an upper film of an organic insulator such that it exhibits the excellent insulating characteristics of the organic insulator while preventing the exposed portion of the semiconductor layer 40 from being damaged by the organic insulator by preventing the exposed portion of the semiconductor layer 40 between the source electrode 65 and the drain electrode 66.

The passivation layer 70 has a plurality of contact holes 73, 76 and 78 exposing the second sensor electrode 63a, the drain electrode 66 and the data line end portion 68, respectively. The passivation layer 70 and the gate insulating layer 30 have contact holes 72 and 74 exposing the first sensor electrode 28a and the gate line end portion 24.

A pixel electrode 82, which is electrically connected to the drain electrode 66 via the contact hole 76, is formed on the passivation layer 70. The pixel electrode 82, with a data voltage applied thereto, creates an electrical field together with a common electrode of an upper substrate (not illustrated), thereby determining the orientation of the molecules of a liquid crystal layer (not illustrated) disposed between the pixel electrode 82 and the common electrode.

In addition, a gate line pad 86 and a data line pad 88 are formed on the passivation layer 70 such that they are electrically connected to the gate line end portion 24 and the data line end portion 68 through the contact holes 74 and 78, respectively. Further, a first sensor pad 84 and a second sensor pad 85 are formed on the passivation layer 70 such that they are connected to the first sensor electrode 28a and the second sensor electrode 63a through the contact holes 72 and 73, respectively. The pixel electrode 82, the first sensor pad 84, the second sensor pad 85, the gate line pad 86 and the data line pad 88 are all made of a transparent conductive material, such as ITO (indium tin oxide) or IZO (indium zinc oxide), or a reflective conductive layer, such as aluminum. The gate line pad 86 and the data line pad 88 optionally supplement and protect adhesion between the gate line end portion 24 and the data line end portion 68 and an external device.

An alignment layer (not illustrated) may be coated on the pixel electrode 82, the first sensor pad 84, the second sensor pad 85, the gate line pad 86, the data line pad 88 and the passivation layer 70 to pre-align the molecules of the liquid crystal layer (not illustrated).

A common electrode panel of the LCD according to the first embodiment of the present invention is described in detail below with reference to FIGS. 4 through 5B.

Figure 4:
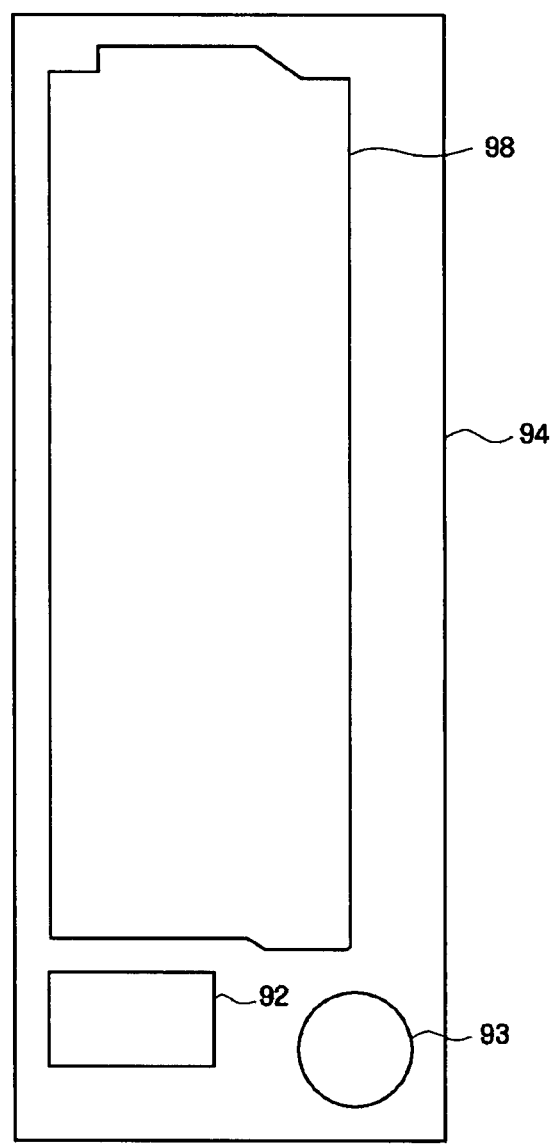
FIG. 4 is a partial plan view of a common electrode panel of the exemplary LCD of FIG. 1, showing a single, exemplary pixel thereof.
Figure 5A:
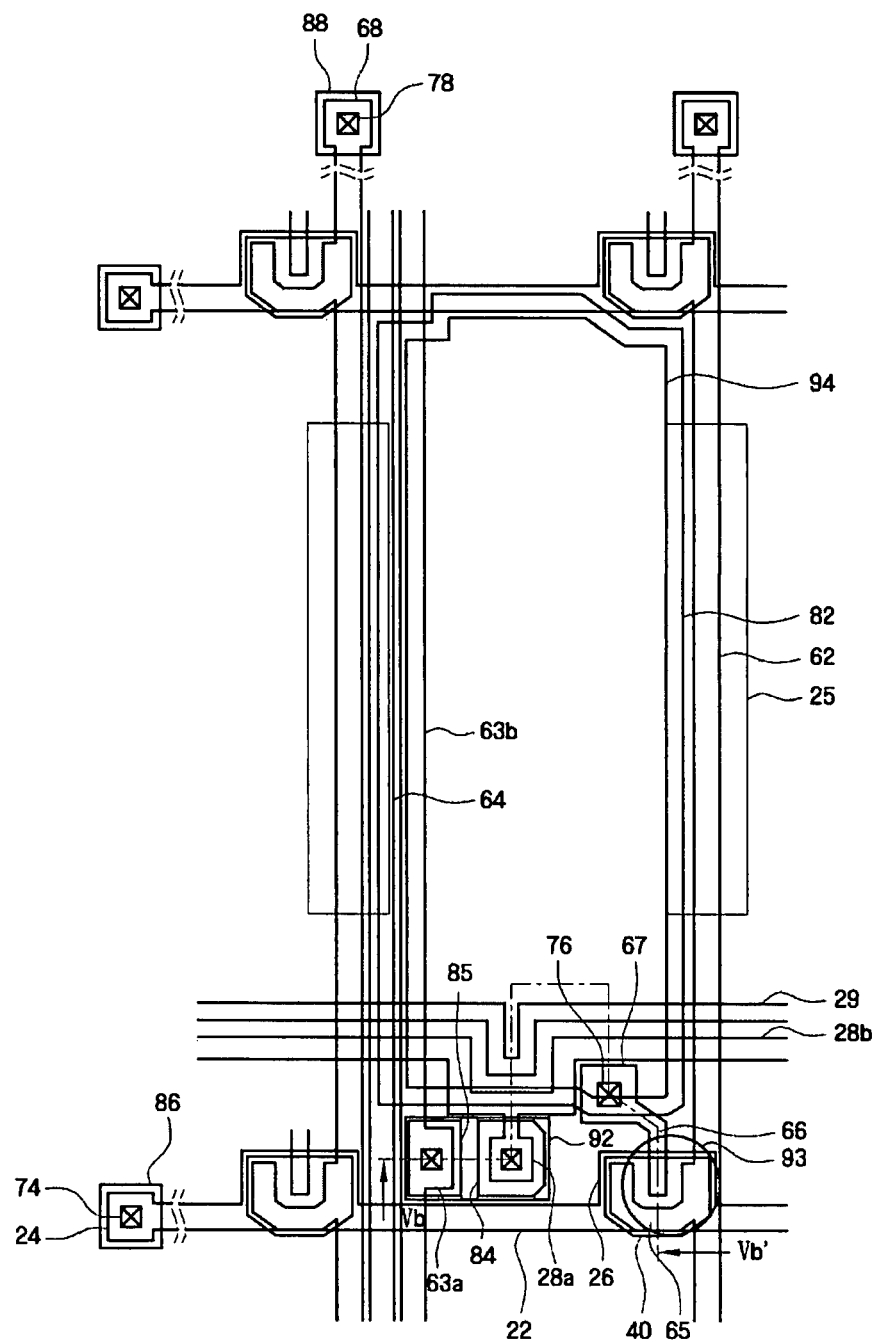
FIG. 5A is a partial plan view of an exemplary LCD with an integrated touch panel including the TFT array panel of FIG. 3A and the common electrode panel of FIG. 4, showing a single, exemplary pixel thereof.

FIG. 4 is a partial plan view of a common electrode panel of the exemplary LCD of FIG. 1, showing a single, exemplary pixel thereof. FIG. 5A is a partial plan view of an exemplary LCD with an integrated touch panel including the TFT array panel of FIG. 3A and the common electrode panel of FIG. 4, showing a single, exemplary pixel thereof, and FIG. 5B is a partial cross-sectional view of the TFT array panel of FIG. 3A, as seen along the lines of the section Vb-Vb' taken therein.

Figure 5B:
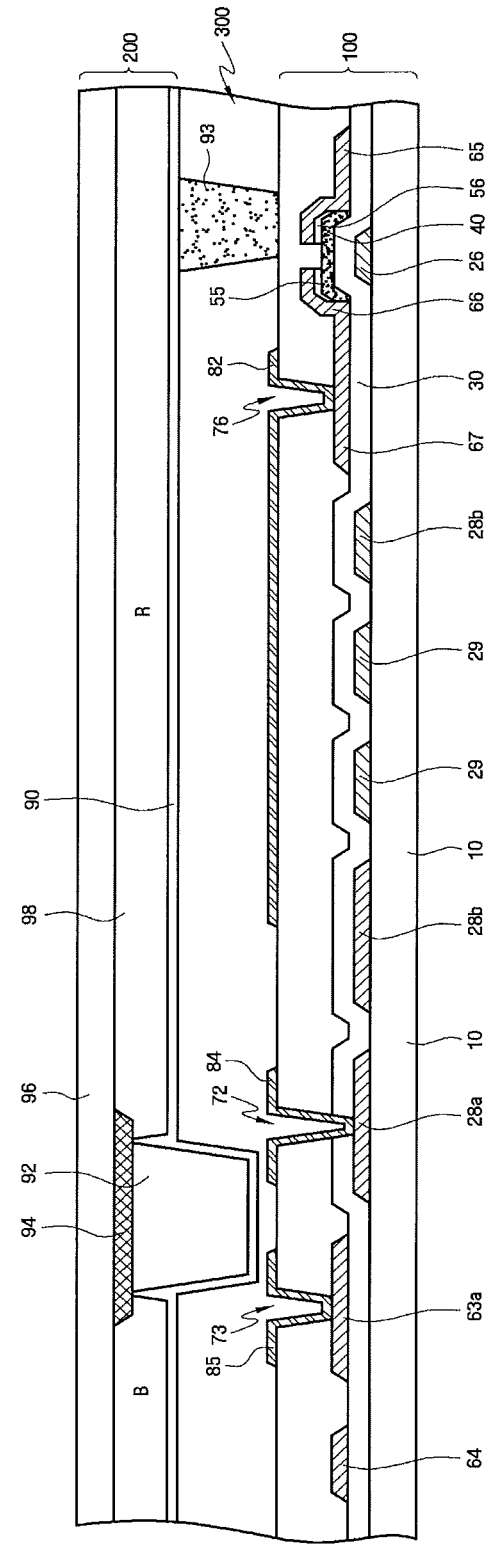
FIG. 5B is a partial cross-sectional view of the TFT array panel of FIG. 3A, as seen along the lines of the section Vb-Vb' taken therein.

Referring to FIGS. 4 through 5B, a black matrix 94 for blocking light leakage, and a plurality of red, green and blue color filters 98 sequentially arranged on respective pixels are formed on an insulating substrate 96 preferably made of a transparent insulating material, such as glass. In the particular exemplary embodiment illustrated, a red color filter 98 is formed on the exemplary pixel.

A sensor spacer 92 is formed on the black matrix 94. In the embodiment illustrated, the sensor spacer 92 may be formed as the color filter 98.

A common electrode 90 is formed on the black matrix 94, the color filter 98 and the sensor spacer 92. The common electrode 90 is preferably made of a transparent conductive material such as, but not limited to, ITO (indium tin oxide) and IZO (indium zinc oxide).

In addition, a support spacer 93 is formed on the common electrode 90. The support spacer 93 maintains a specific gap between the TFT array panel 100 and the common electrode panel 200, thereby forming a predetermined cell gap. The support spacer 93 may be made of, e.g., a photosensitive resin. The support spacer 93 and the sensor spacer 92 are both preferably disposed so as to overlap the black matrix 94. However, in an alternative embodiment, the support spacer 93 and the sensor spacer 92 may not overlap the black matrix 94.

An alignment layer (not illustrated) may be coated on the common electrode 90 to align liquid crystal molecules.

In an initial state where there is no external pressure applied, that is, in the absence of an electric field, the sensor spacer 92 is separated from the TFT array panel 100. However, upon application of an external pressure, the common electrode 90 provided on the sensor spacer 92 contacts the first sensor pad 84 and the second sensor pad 85, thereby electrically connecting the common electrode 90, the first sensor pad 84, and the second sensor pad 85.

As illustrated in FIG. 5B, the above TFT array panel 100 and the common electrode panel 200 are aligned and combined with each other, and subsequently, a liquid crystal layer 300 is formed, thereby completing the basic configuration of an exemplary embodiment of a touch screen display device in accordance with the present invention. The TFT array panel 100 and the common electrode panel 200 are aligned such that the pixel electrode 82 and the color filter 98 are precisely aligned with each other.

In addition to the basic configuration described above, the touch screen display device also includes various other elements, including polarizers, a backlight unit, and so on. The polarizers (not illustrated) are provided at opposite sides of the basic configuration of a touch screen display device such that one of their polarization axes is, e.g., parallel to the gate line 22, while the other of their polarization axes is perpendicular to the gate line 22.

Figure 6:
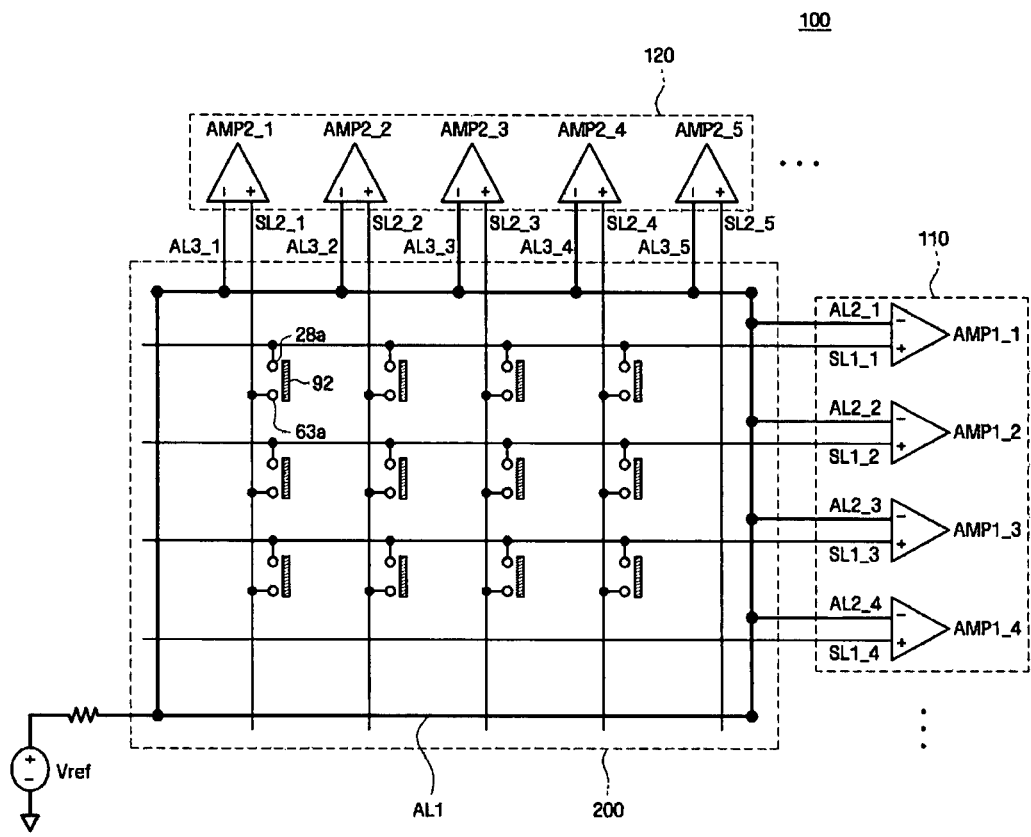
FIG. 6 is a partial schematic diagram a second exemplary embodiment of an LCD with an integrated touch panel in accordance with the present invention.

FIG. 6 is a partial schematic diagram a second exemplary embodiment of an LCD with an integrated touch panel in accordance with the present invention. In FIG. 6, a plurality of first and second sensor lines SL1_1 through SL1_4 and SL2_1 through SL2_5 are respectively formed in first and second directions on an insulating substrate 10 of a TFT array panel 100 of the second exemplary embodiment.

A first dummy line AL1 is formed along the periphery of the insulating substrate 10, and second and third dummy lines AL2_1 through AL2_4, and AL3_1 through AL3_5 are formed in the first and second directions, respectively. In this embodiment, the first dummy line AL1 is connected to the second and third dummy lines AL2_1 through AL2_4 and AL3_1 through AL3_5. A reference voltage Vref is applied to the first, second and third dummy lines AL1, AL2_1 through AL2_4, and AL3_1 through AL3_5.

The first and second sensor lines SL1_1 through SL1_4 and SL2_1 through SL2_5 are connected to the first and second sensor electrodes 28a and 63a, respectively.

When an external pressure is applied to the surface of the display, a sensor spacer 92 formed on the common electrode panel 200 and located in the vicinity of the applied pressure is electrically connected to the first and second sensor electrodes 28a and 63a formed on the TFT array panel 100, so that a predetermined voltage is transmitted to the first and second sensor lines SL1_1 through SL1_4 and SL2_1 through SL2_5.

In addition, the TFT array panel 100 includes a plurality of first comparators AMP1_1 through AMP1_4 respectively connected to the first sensor lines SL1_1 through SL1_4 and the second dummy lines AL2_1 through AL2_4 and amplifying voltage differences between each of the first sensor lines SL1_1 through SL1_4 and each of the second dummy lines AL2_1 through AL2_4 and then outputting the amplified voltage differences, and a plurality of second comparators AMP2_1 through AMP2_5 respectively connected to the second sensor lines SL2_1 through SL2_5 and the third dummy lines AL3_1 through AL3_5 and amplifying voltage differences between each of the second sensor lines SL2_1 through SL2_5 and each of the third dummy lines AL3_1 through AL3_5 and then outputting the amplified voltage differences.

The purpose in forming the first dummy line AL1_1 along the periphery of the insulating substrate 10 and the second and third dummy lines AL2_1 through AL2_4 and AL3_1 through AL3_5 connected thereto in the second exemplary embodiment is as follows.

When the first and second sensor lines SL1_1 through SL1_4 and SL2_1 through SL2_5 are affected by coupling with the common electrode provided on the common electrode panel 200, the first dummy line AL1_1 is made to be similarly affected by coupling with the first and second sensor lines SL1_1 through SL1_4 and SL2_1 through SL2_5. Accordingly, the first dummy line AL1_1 and the first and second sensor lines SL1_1 through SL1_4 and SL2_1 through SL2_5 have substantially the same phases. Therefore, according to the second exemplary embodiment, as in the first exemplary embodiment described above, the first and second comparators AMP1_1 through AMP1_4 and AMP2_1 through AMP2_5 prevent an erroneous determination of polarity, which may be caused due to the determination of relative polarities through the first and second sensor lines SL1_1 through SL1_4 and SL2_1 through SL2_5, and the second and third dummy lines AL2_1 through AL2_4 and AL3_1 through AL3_5.

Figure 7:
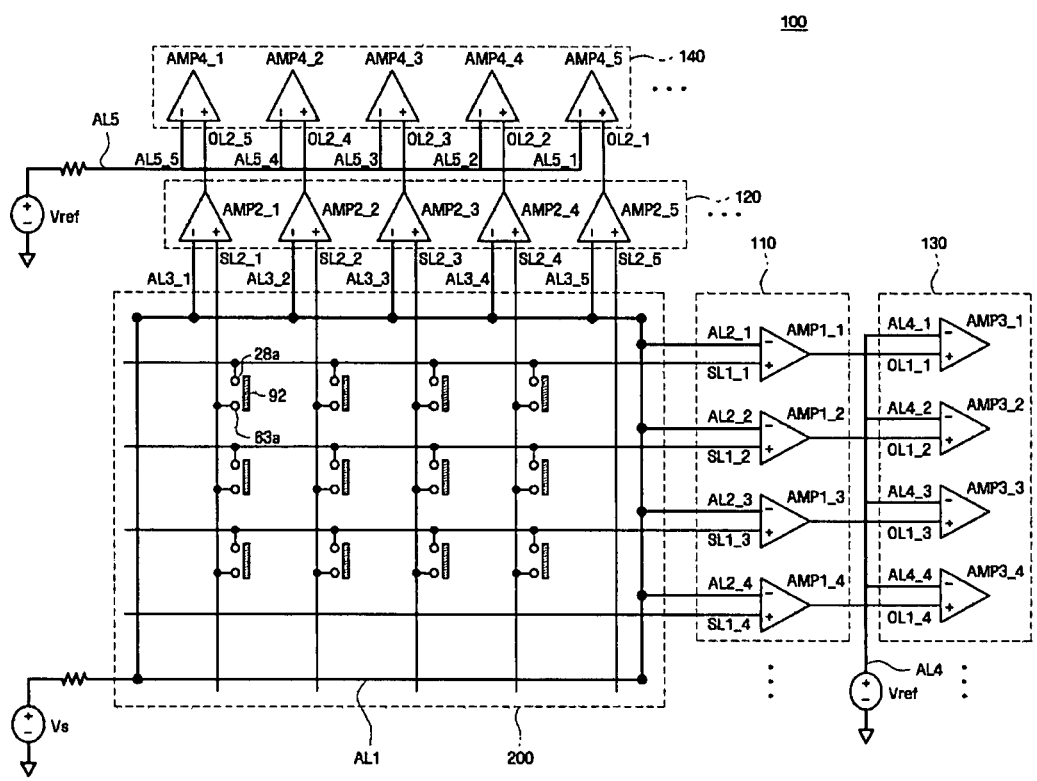
FIG. 7 is a partial schematic diagram of a third exemplary embodiment of an LCD with an integrated touch panel in accordance with the present invention.

FIG. 7 is a partial schematic diagram of a third exemplary embodiment of an LCD with an integrated touch panel in accordance with the present invention. In the embodiment of FIG. 7, a plurality of first and second sensor lines SL1_1 through SL1_4 and SL2_1 through SL2_5 are formed in first and second directions on an insulating substrate 10 of a TFT array panel 100 of the LCD.

A first dummy line AL1 is formed along the periphery of the insulating substrate 10, and second and third dummy lines AL2_1 through AL2_4 and AL3_1 through AL3_5 are formed in the first and second directions, respectively. In this embodiment, the first dummy line AL1 is connected to the second and third dummy lines AL2_1 through AL2_4 and AL3_1 through AL3_5. An initial voltage Vs is applied to the first, second, and third dummy lines AL1, AL2_1 through AL2_4, and AL3_1 through AL3_5, and the initial voltage Vs is lower than a common voltage.

The first and second sensor lines SL1_1 through SL1_4 and SL2_1 through SL2_5 are connected to the first and second sensor electrodes 28a and 63a, respectively. When an external pressure is applied to the screen of the display, a sensor spacer 92 formed on the common electrode panel 200 is electrically connected to the first and second sensor electrodes 28a and 63a formed on the TFT array panel 100, so that a predetermined voltage is transmitted to the first and second sensor lines SL1_1 through SL1_4 and SL2_1 through SL2_5.

The TFT array panel 100 includes a plurality of first comparators AMP1_1 through AMP1_4 respectively connected to the first sensor lines SL1_1 through SL1_4 and the second dummy lines AL2_1 through AL2_4 and amplifying voltage differences between each of the first sensor lines SL1_1 through SL1_4 and each of the second dummy lines AL2_1 through AL2_4 and then outputting the amplified voltage differences, and a plurality of second comparators AMP2_1 through AMP2_5 respectively connected to the second sensor lines SL2_1 through SL2_5 and the third dummy lines AL3_1 through AL3_5 and amplifying voltage differences between each of the second sensor lines SL2_1 through SL2_5 and each of the third dummy lines AL3_1 through AL3_5 and then outputting the amplified voltage differences.

In addition, the TFT array panel 100 includes a plurality of third comparators AMP3_1 through AMP3_4 respectively connected to output ports OL1_1 through OL1_4 of the first comparators AMP1_1 through AMP1_4 and fourth dummy lines AL4_1 through AL4_4 and amplifying voltage differences between each of the output ports OL1_1 through OL1_4 and each of the fourth dummy lines AL4_1 through AL4_4 and then outputting the amplified voltage differences, and a plurality of fourth comparators AMP4_1 through AMP4_5 respectively connected to output ports OL2_1 through OL2_5 of the second comparators AMP2_1 through AMP2_5 and fifth dummy lines AL5_1 through AL5_5 and amplifying voltage differences between each of the output ports OL2_1 through OL2_5 and each of the fifth dummy lines AL5_1 through AL5_5 and then outputting the amplified voltage differences. Here, a reference voltage Vref is applied to the fourth and fifth dummy lines AL4_1 through AL4_4 and AL5_1 through AL5_5.

According to the third exemplary embodiment, which is a modification of the second embodiment, an initial voltage, which has been applied to the first and second sensor lines SL1_1 through SL1_4 and SL2_1 through SL2_5, is applied to the first, second and third dummy lines AL1, AL2_1 through AL2_4, and AL3_1 through AL3_5, and the third and fourth comparators AMP3_1 through AMP3_4 and AMP4_1 through AMP4_5 are connected to the output ports of the first and second comparators AMP1_1 through AMP1_4 and AMP2_1 through AMP2_5, respectively. The purpose of the foregoing arrangement is as follows.

When the initial voltage Vs, which has been applied to the first and second sensor lines SL1_1 through SL1_4 and SL2_1 through SL2_5, is applied to the first, second and third dummy lines AL1, AL2_1 through AL2_4, and AL3_1 through AL3_5, the voltage applied to the first and second sensor lines SL1_1 through SL1_4 and SL2_1 through SL2_5 and the voltage applied to the first, second and third dummy lines AL1, AL2_1 through AL2_4, and AL3_1 through AL3_5, are equal.

In other words, when no external pressure is applied to the display, the same voltage is applied to the first and second sensor lines SL1_1 through SL1_4 and SL2_1 through SL2_5, as well as to the first, second and third dummy lines AL1, AL2_1 through AL2_4, and AL3_1 through AL3_5, so that the output of the first and second comparators AMP1_1 through AMP1_4, and AMP2_1 through AMP2_5 is '0'.

In addition, when an external pressure is applied to the display, a predetermined voltage is applied to the first and second sensor lines SL1_1 through SL1_4 and SL2_1 through SL2_5, so that the first and second comparators AMP1_1 through AMP1_4 and AMP2_1 through AMP2_5 output a high level signal and then input the high level signal to the third and fourth comparators AMP3_1 through AMP3_4 and AMP4_1 through AMP4_5. The third and fourth comparators AMP3_1 through AMP3_4 and AMP4_1 through AMP4_5 then compare the outputted high level signal with the reference voltage Vref and output a high level signal. Accordingly, it is possible to effectively eliminate coupling noises occurring in the first and second sensor lines SL1_1 through SL1_4 and SL2_1 through SL2_5 because AC noise that is capacitively coupled from the common electrode to the first and second sensor lines SL1_1 through SL1_4 and SL2_1 through SL2_5 is also capacitively coupled from the common electrode to dummy line AL1 and the AC noise on AL1 is subtracted out by comparators AMP1_1 through AMP1_4 and AMP2_1 through AMP2_5 so that the touch-indicating output signals output by the respective comparators are unaffected by coupling of noise from the common electrode of the common electrode panel 200.

Figure 8:
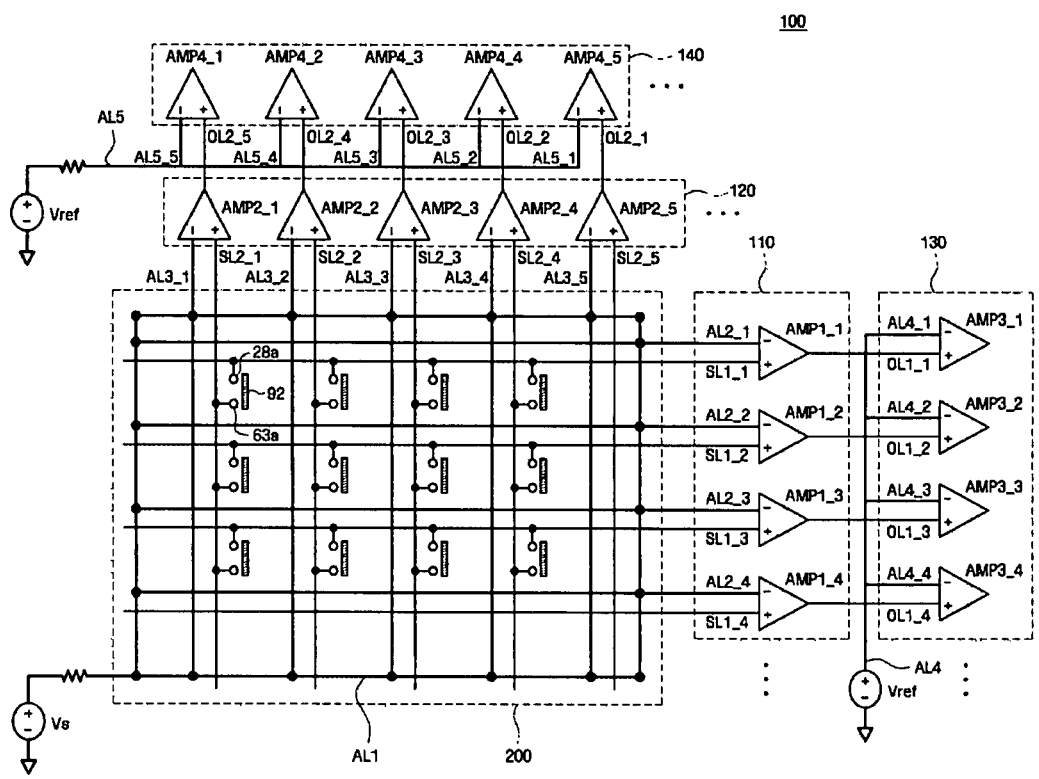
FIG. 8 is a partial schematic diagram of a fourth exemplary embodiment of an LCD with an integrated touch panel in accordance with the present invention; and, FIG. 9 is a partial schematic diagram of a fifth exemplary embodiment of an LCD with an integrated touch panel in accordance with the present invention.

FIG. 8 is a partial schematic diagram of a fourth exemplary embodiment of an LCD with an integrated touch panel in accordance with the present invention. In the exemplary LCD of FIG. 8, a plurality of first and second sensor lines SL1_1 through SL1_4 and SL2_1 through SL2_5 are formed in first and second directions on an insulating substrate 10 of a TFT array panel 100 of the LCD.

A first dummy line AL1 is formed along the periphery of the insulating substrate 10, and the plurality of second and third dummy lines AL2_1 through AL2_4 and AL3_1 through AL3_5 are formed in the same directions as the first and second sensor lines SL1_1 through SL1_4 and SL2_1 through SL2_5, respectively. In this embodiment, the first dummy line AL1 is connected to the second and third dummy lines AL2_1 through AL2_4 and AL3_1 through AL3_5. An initial voltage Vs is applied to the first, second, and third dummy lines AL1, AL2_1 through AL2_4, and AL3_1 through AL3_5, the initial voltage Vs being lower than a common voltage.

The first and second sensor lines SL1_1 through SL1_4 and SL2_1 through SL2_5 are connected to the first and second sensor electrodes 28a and 63a, respectively. When an external pressure is applied to the display, a sensor spacer 92 formed on the common electrode panel 200 is electrically connected to the first and second sensor electrodes 28a and 63a formed on the TFT array panel 100, so that a predetermined voltage is transmitted to the first and second sensor lines SL1_1 through SL1_4 and SL2_1 through SL2_5.

The TFT array panel 100 includes a plurality of first comparators AMP1_1 through AMP1_4 respectively connected to first sensor lines SL1_1 through SL1_4 and second dummy lines AL2_1 through AL2_4 and amplifying voltage differences between each of the first sensor lines SL1_1 through SL1_4 and each of the second dummy lines AL2_1 through AL2_4 and then outputting the amplified voltage differences, and a plurality of second comparators AMP2_1 through AMP2_5 respectively connected to second sensor lines SL2_1 through SL2_5 and third dummy lines AL3_1 through AL3_5 and amplifying voltage differences between each of the second sensor lines SL2_1 through SL2_5 and each of the third dummy lines AL3_1 through AL3_5 and then outputting the amplified voltage differences.

In addition, the TFT array panel 100 includes a plurality of third comparators AMP3_1 through AMP3_4 respectively connected to output ports OL1_1 through OL1_4 of the first comparators AMP1_1 through AMP1_4 and fourth dummy lines AL4_1 through AL4_4 and amplifying voltage differences between each of the output ports OL1_1 through OL1_4 and each of the fourth dummy lines AL4_1 through AL4_4 and then outputting the amplified voltage differences, and a plurality of fourth comparators AMP4_1 through AMP4_5 respectively connected to output ports OL2_1 through OL2_5 of the second comparators AMP2_1 through AMP2_5 and fifth dummy lines AL5_1 through AL5_5 and amplifying voltage differences between each of the output ports OL2_1 through OL2_5 and each of the fifth dummy lines AL5_1 through AL5_5 and then outputting the amplified voltage differences. Here, a reference voltage Vref is applied to the fourth and fifth dummy lines AL4_1 through AL4_4 and AL5_1 through AL4_5.

The fourth exemplary LCD is a modification of the third exemplary embodiment of FIG. 7, and has substantially the same configuration as the latter, except that the second and third dummy lines AL2_1 through AL2_4 and AL3_1 through AL3_5 formed in the same directions as SL1_1 through SL1_4 and SL2_1 through SL2_5, respectively, are formed to intersect the second and first sensor lines SL2_1 through SL2_5 and SL1_1 through SL1_4, respectively. Therefore, the fourth exemplary embodiment operates similar to and achieves substantially the same benefits as those of the third exemplary embodiment of the present invention described above.

Figure 9:
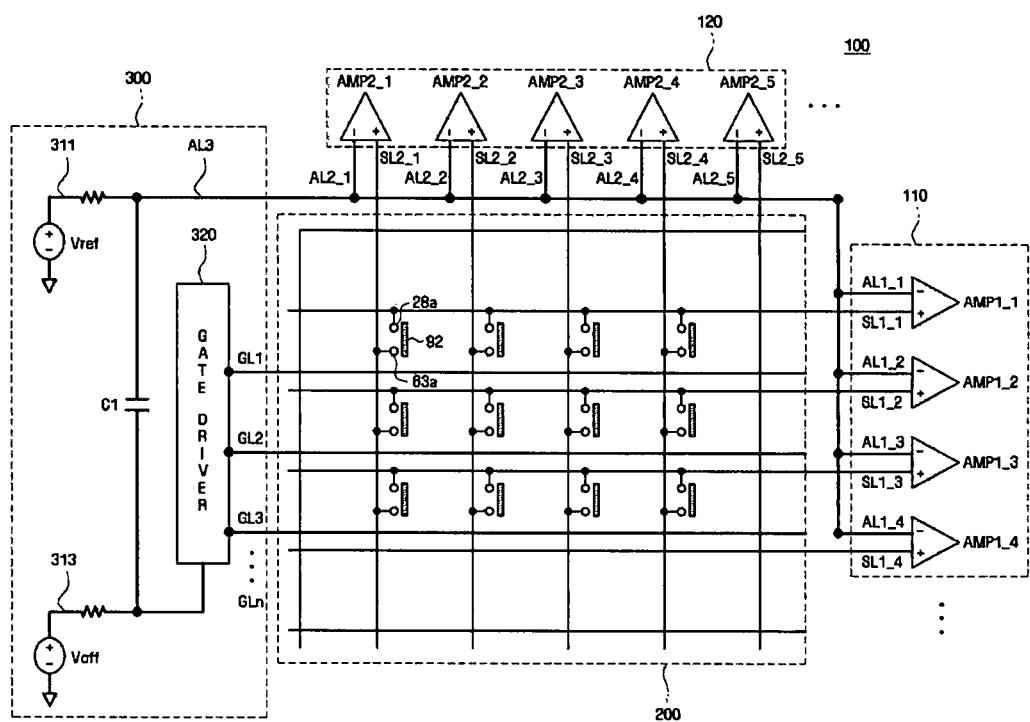

FIG. 9 is a partial schematic diagram of a fifth exemplary embodiment of an LCD with an integrated touch panel in accordance with the present invention. In the exemplary embodiment of FIG. 9, a plurality of first and second sensor lines SL1_1 through SL1_4 and SL2_1 through SL2_5 are formed in first and second directions on an insulating substrate 10 of a TFT array panel 100 of the LCD.

A plurality of first and second dummy lines AL1_1 through AL1_4 and AL2_1 through AL2_5 are formed in the first and second directions, and a third dummy line AL3 is connected to the first and second dummy lines AL1_1 through AL1_4 and AL2_1 through AL2_5, respectively. Here, a reference voltage Vref is applied to the first, second, and third dummy lines AL1_1 through AL1_4, AL2_1 through AL2_5, and AL3.

The first and second sensor lines SL1_1 through SL1_4 and SL2_1 through SL2_5 are connected to the first and second sensor electrodes 28a and 63a, respectively. When an external pressure is applied to the display, a sensor spacer 92 formed on the common electrode panel 200 is electrically connected to the first and second sensor electrodes 28a and 63a formed on the TFT array panel 100, so that a predetermined voltage is transmitted to the first and second sensor lines SL1_1 through SL1_4 and SL2_1 through SL2_5.

In addition, the TFT array panel 100 includes a plurality of first comparators AMP1_1 through AMP1_4 respectively connected to the first sensor lines SL1_1 through SL1_4 and first dummy lines AL1_1 through AL1_4 and amplifying voltage differences between each of the first sensor lines SL1_1 through SL1_4 and each of the first dummy lines AL1_1 through AL1_4 and then outputting the amplified voltage differences, and a plurality of second comparators AMP2_1 through AMP2_5 respectively connected to the second sensor lines SL2_1 through SL2_5 and the second dummy lines AL2_1 through AL2_5 and amplifying voltage differences between each of the second sensor lines SL2_1 through SL2_5 and each of the second dummy lines AL2_1 through AL2_5 and then outputting the amplified voltage differences.

In the fifth exemplary embodiment of FIG. 9, the TFT array panel 100 is connected to a printed circuit board 300 on which a plurality of components for driving TFTs are mounted. As shown in FIG. 9, the printed circuit board 300 includes a first interconnection line 311 through which a predetermined voltage is applied to the first, second and third dummy lines AL1_1 through AL1_4, AL2_1 through AL2_5, and AL3, a second interconnection line 313 through which a gate-off voltage Voff is applied to gate lines GL1 through GLn, a gate driver 320 receiving the gate-off voltage Voff from the second interconnection line 313 and sequentially applying the gate-off voltage Voff to the gate lines GL1 through GLn, and a capacitor C1 coupled between the first interconnection line 311 and the second interconnection line 313 for eliminating coupling noises occurring therebetween. A reference voltage Vref is applied to the first interconnection line 311.

The capacitor C1 is disposed between the first interconnection line 311 and the second interconnection line 313 of the fifth exemplary embodiment of the present invention for the following reasons.

The gate-off voltage Voff is applied to the gate lines GL1 through GLn connected to the gate driver 320, excluding gate lines GL1 through GLn to which a gate-on voltage Von has been supplied. Here, a common voltage may be distorted due to coupling between the data lines formed on the TFT array panel 100 and the common electrode formed on the common electrode panel 200. In this case, upon application of the gate-off voltage Voff to the gate lines GL1 through GLn, the voltage is also coupled with the common electrode or the data lines.

To solve this problem, the capacitor C1 is disposed between the first interconnection line 311 and the second interconnection line 313 to level-shift the gate-off voltage Voff supplied to the level of the reference voltage Vref, thereby applying the reference voltage Vref to the first, second and third dummy lines AL1_1 through AL1_4, AL2_1 through AL2_5, and AL3. Accordingly, the first and second sensor lines SL1_1 through SL1_4 and SL2_1 through SL2_5 and the first and second dummy lines AL1_1 through AL1_4 and AL2_1 through AL2_5 have substantially the same phases. Therefore, in the fifth exemplary embodiment, the first and second comparators AMP1_1 through AMP1_4 and AMP2_1 through AMP2_5 are prevented from making an erroneous polarity determination, which may be caused due to determination of relative polarities through the first and second sensor lines SL1_1 through SL1_4 and SL2_1 through SL2_5 and the first and second dummy lines AL1_1 through AL1_4 and AL2_1 through AL2_5.

While the fifth exemplary embodiment has been described and illustrated with the reference voltage Vref being applied to the first, second and third dummy lines AL1_1 through AL1_4, AL2_1 through AL2_5, and AL3, the invention is not limited to the particular example illustrated and described, and the initial voltage Vs, which is applied to the first and second sensor lines SL1_1 through SL1_4 and SL2_1 through SL2_5, may also be applied to the first, second and third dummy lines AL1_1 through AL1_4, AL2_1 through AL2_5, and AL3. In this case, a comparator having the same configuration as in the fourth exemplary embodiment may be employed, that is, a comparator including first through fourth comparators may be employed.

In accordance with the exemplary embodiments described herein, display touch panel sensor malfunction is prevented by eliminating coupling noises.

While the present invention has been particularly shown and described with reference to exemplary embodiments thereof, it will be understood in light of the foregoing and by those of ordinary skill in the art that various changes in form and details may be made therein without departing from the spirit and scope of the present teachings. It is therefore desired that the present embodiments be considered in all respects as illustrative and not restrictive, with reference being made to the appended claims and their functional equivalents rather than the foregoing description to indicate the scope of the claimed subject matter.

What is claimed is:
1. An LCD with an integrated touch panel, comprising:
a thin film transistor array panel comprising:
a first insulating substrate;
a gate line formed on the first insulating substrate so as to extend in a first direction;
a data line formed in a second direction and intersecting the gate line;
a thin film transistor (TFT) electrically connected to the gate line and the data line;
a first sensor line extended in the first direction;
a second sensor line extended in the second direction;
a first dummy line extended in the first direction to intersect the data lines, and
a second dummy line extended in the second direction to intersect the gate line, and
a common electrode panel disposed on the thin film transistor array panel and comprising a common electrode,
wherein the first sensor line and the second sensor line are connected to first and second electrodes formed on the first insulating substrate, respectively, and
wherein a common voltage applied to the common electrode is applied to the first sensor line and the second sensor line through the first and second electrodes when an external pressure is applied to the touch panel in the vicinity of the electrodes; and
a first comparator connected to the first sensor line and the first dummy line and amplifying a voltage difference between the first sensor line and the first dummy line and then outputting the amplified voltage difference; and, a second comparator connected to the second sensor line and the second dummy line and amplifying a voltage difference between the second sensor line and the second dummy line and then outputting the amplified voltage difference.

2. The LCD of claim 1, wherein a reference voltage is applied to the first and the second dummy lines.

3. The LCD of claim 1, wherein the first sensor line and the first dummy line are formed in the same layer as the gate lines.

4. The LCD of claim 1, wherein the second sensor line and the second dummy line are formed in the same layer as the data lines.

5. The LCD of claim 1, wherein a reference voltage is applied to the first and the second dummy lines.

6. The LCD of claim 5, wherein the first sensor line and the first dummy line are formed in the same layer as the gate line.

7. The LCD of claim 6, wherein the second sensor line and the second dummy line are formed in the same layer as the data line.

8. The LCD of claim 5, wherein the second sensor line and the second dummy line are formed in the same layer as the data line.

9. The LCD of claim 1, wherein a reference voltage is applied to the first and the second dummy lines.

10. The LCD of claim 9, wherein the first sensor line and the first dummy line are formed in the same layer as the gate line.

11. The LCD of claim 10, wherein the second sensor line and the second dummy line are formed in the same layer as the data line.

12. The LCD of claim 1, wherein an end portion of the first dummy line and an end portion of the second dummy line are connected to each other.

13. An LCD with an integrated touch panel comprising:
a thin film transistor array panel comprising:
a first insulating substrate;
a plurality of gate lines formed on the first insulating substrate and extended in a first direction;
a plurality of data lines extended in a second direction and intersecting the gate lines;
a plurality of thin film transistors (TFTs) electrically connected to the gate lines and the data lines;
a plurality of first sensor lines formed in the first direction;
a plurality of second sensor lines formed in the second direction;
a plurality of first dummy lines formed in the first direction to intersect the data line;
a plurality of second dummy lines formed in the second direction to intersect the gate line;
a plurality of first comparators, wherein each of the first comparators are connected to one of the first sensor lines and one of the first dummy lines; and
a plurality of second comparators, wherein each of the second comparators are connected to one of the second sensor lines and one of the second dummy lines, and
a common electrode panel disposed on the thin film transistor array panel and comprising a common electrode,
wherein the first sensor line and the second sensor line are connected to first and second electrodes formed on the first insulating substrate, respectively, and
wherein a common voltage applied to the common electrode is applied to the first sensor line and the second sensor line through the first and second electrodes when an external pressure is applied to the touch panel in the vicinity of the electrodes.

14. The LCD of claim 13, wherein the first sensor lines and the first dummy lines are disposed alternately, and the second sensor lines and the second dummy lines are disposed alternately.

15. The LCD of claim 13, wherein a reference voltage is applied to the first and the second dummy lines.

16. The LCD of claim 14, wherein the first dummy lines are connected to each other, and the second dummy lines are connected to each other.

17. The LCD of claim 16, wherein the first sensor line and the first dummy line are formed in the same layer as the gate line, and wherein the second sensor line and the second dummy line are formed in the same layer as the data line.

* * * * *